United States Patent [19]

Barbour

[11] Patent Number: 5,520,730

[45] Date of Patent: * May 28, 1996

[54] SETTABLE COMPOSITION FOR GENERAL PURPOSE CONCRETE AND METHOD OF MAKING SAME

[76] Inventor: Ronald L. Barbour, 3339-K Circle Brook Dr., SW., Roanoke, Va. 24014

[*] Notice: The portion of the term of this patent subsequent to Feb. 12, 2008, has been disclaimed.

[21] Appl. No.: 141,580

[22] Filed: Oct. 27, 1993

Related U.S. Application Data

[63] Continuation of Ser. No. 946,785, Sep. 18, 1992, abandoned, which is a continuation of Ser. No. 650,067, Feb. 7, 1991, abandoned, which is a continuation-in-part of Ser. No. 229,454, Aug. 8, 1988, Pat. No. 4,992,102.

[51] Int. Cl.$^6$ ....................................... C04B 14/00
[52] U.S. Cl. .................... 106/707; 106/709; 106/737; 106/738; 106/DIG. 1; 264/DIG. 49
[58] Field of Search ...................... 106/709, 751, 106/763, 738, DIG. 1, 705, 707, 713, 737; 264/DIG. 49

[56] References Cited

U.S. PATENT DOCUMENTS

| | | | |
|---|---|---|---|
| 3,961,973 | 6/1976 | Jones | 106/709 |
| 4,018,617 | 4/1977 | Nicholson | 106/751 |
| 4,210,457 | 7/1980 | Dodson et al. | 106/709 |
| 4,222,785 | 9/1980 | Henderson | 106/709 |
| 4,240,952 | 12/1980 | Hulbert, Jr. et al. | 106/709 |
| 4,268,316 | 5/1981 | Wills, Jr. | 106/709 |
| 4,336,069 | 6/1982 | Dodson et al. | 106/709 |
| 4,397,801 | 8/1983 | Minnick | 106/709 |
| 4,398,960 | 8/1983 | Murray | 106/738 |
| 4,432,800 | 2/1984 | Kneller et al. | 106/707 |
| 4,518,431 | 5/1985 | Duvier, Jr. | 106/679 |
| 4,559,881 | 12/1985 | Lankard et al. | 106/644 |
| 4,741,777 | 5/1988 | Williams et al. | 106/709 |
| 4,741,782 | 5/1988 | Styron | 106/709 |
| 4,842,649 | 6/1989 | Heitzmann et al. | 106/709 |
| 4,992,102 | 2/1991 | Barbour | 106/645 |
| 5,266,111 | 11/1993 | Barbour | 106/709 |

*Primary Examiner*—Mark L. Bell
*Assistant Examiner*—Michael Marcheschi
*Attorney, Agent, or Firm*—William J. Daniel

[57] ABSTRACT

From about 25% to about 50% but not more than about 200 lbs of the Portland cement of a general purpose concrete mix which contains for each cubic yard of the concrete to be produced in generally homogeneous admixture about 400–750 lbs. portland cement, about 1600–2000 lbs. coarse aggregate of a size of at least about ⅜ inch, and sufficient fine aggregate of a size less than ⅜ inch and up to minor amounts of conventional additives to yield one cubic yard when the admixture is combined with water in an amount equal to about 40–70% by weight of said portland cement, is replaced with a) Class F fly ash having a calcium oxide content up to about 6% and b) cement kiln dust (CKD) in a weight ratio of fly ash to CKD of about 2:3–3:2. Preferably, 30% or more of the Portland cement is replaced.

9 Claims, No Drawings

SETTABLE COMPOSITION FOR GENERAL PURPOSE CONCRETE AND METHOD OF MAKING SAME

CROSS REFERENCE TO RELATED APPLICATIONS

This application is an continuation of application Ser. No. 07/946,785, filed Sep. 18, 1992, now abandoned, which is a continuation of application Ser. No. 07/650,067, filed Feb. 7, 1991, now abandoned which is a continuation-in-part of application Ser. No. 07/229,454, filed Aug. 8, 1988, now U.S. Pat. No. 4,992,102.

FIELD OF THE INVENTION

This invention relates to the field of settable compositions for general purpose concrete construction containing Class F fly ash and cement kiln dust as a substantial replacement for portland cement conventionally used in such compositions.

BACKGROUND OF THE INVENTION

This invention is concerned with the utilization of two industrial by-products; namely, Class F fly ash and cement kiln dust (hereinafter CKD) in general purpose concrete-making composition. When finely divided or pulverized coal is combusted at high temperatures, for example, in boilers for the steam generation of electricity, the ash consisting of the uncombustible residue plus a small amount of residual combustible matter, is made up of two fractions, a bottom ash recovered from the furnace or boiler in the form of a slag-like material and a fly ash which remains suspended in the flue gases from the combustion until separated therefrom by known separatory techniques, such as electrostatic precipitation. This fly ash is an extremely finely divided material generally in the form of spherical bead-like particles, with at least 70% by weight passing a 200 mesh sieve and has a generally glassy state, resulting from fusion or sintering during combustion. As recognized in the American Society of Testing Materials (ASTM) specification designation C618-85 entitled "Fly Ash and Raw or Calcined Natural Pozzolan for Use as a Mineral Admixture in portland Cement Concrete", fly ash is subdivided into two distinct classifications; namely, Class F and Class C. The definitions of these two classes are as follows:

"Class F—Fly ash normally produced from burning anthracite or bituminous coal that meets the applicable requirements for this class as given herein. This class fly ash has pozzolanic properties.

Class C—Fly ash normally produced from lignite or subituminous coal that meets the applicable requirements for this class as given herein. This class of fly ash, in addition to having pozzolanic properties, also has some cementitious properties. Some Class C fly ashes may contain lime contents higher than 10%."

The latter reference to "pozzolanic properties" refers to the capability of certain mixtures which are not in themselves cementitious of undergoing a cementitious reaction when mixed with lime in the presence of water. Class C fly ash possesses direct cementitious properties as well as pozzolanic properties. ASTM C618-85 is also applicable to natural pozzolanic materials which are separately classified as Class N but are not pertinent here.

As the above quotation indicates, the type of coal to be combusted generally determines which class fly ash results, and the type of coal in turn is often dependent on its geographic origin. Thus, Class C fly ash frequently results from coals mined in the Midwest; whereas Class F fly ash often comes from coals mined in the Appalachian region. The ASTM specification imposes certain "chemical requirements" upon the respective fly ash classifications thereof which are set forth below for the relevant Classes F and C, including footnotes:

TABLE I-A

CHEMICAL REQUIREMENTS

| | Mineral Admixture Class | |
|---|---|---|
| | F | C |
| Silicon dioxide ($SiO_2$) plus aluminum oxide ($Al_2O_3$) plus iron oxide ($Fe_2O_3$), min, % | 70.0 | 50.0 |
| Sulfur trioxide ($SO_3$), max, % | 5.0 | 5.0 |
| Moisture content, max. % | 3.0 | 3.0 |
| Loss on ignition, max, % | 6.0[1] | 6.0 |

[1] The use of Class F pozzolan containing up to 12.0% loss on ignition may be approved by the user of either acceptable performance records or laboratory test results are made available.

TABLE I-B

SUPPLEMENTARY OPTIONAL CHEMICAL REQUIREMENT

Note: This optional requirement applies only when specifically requested.

| | F | C |
|---|---|---|
| Available alkalies, as $Na_2O$, max, %[2] | 1.50 | 1.50 |

[2] Applicable only when specifically required by the purchaser for mineral admixture to be used in concrete containing reactive aggregate and cement to meet a limitation on content of alkalies.

The ASTM physical requirements for both fly ash classes are virtually the same and are reproduced below exclusive of cautionary footnotes:

TABLE I-C

PHYSICAL REQUIREMENTS

| | Mineral Admixture Class | |
|---|---|---|
| | F | C |
| Fineness: | | |
| Amount retained when wet-sieved on No. 325 (45 µm) sieve, max % | 34 | 34 |
| Pozzolanic activity index: | | |
| With portland cement, at 28 days, min. percent of control | 75 | 75 |
| With lime, at 7 days min, psi (kPa) | 800 (5500) | ... |
| Water requirement, max, percent of control | 105 | 105 |
| Soundness: | | |
| Autoclave expansion or contraction, max % | 0.8 | 0.8 |
| Uniformity requirements: | | |
| The specific gravity and fineness of individual samples shall not vary from the average established by the ten preceding tests, or by all preceding tests if the number is less than ten, by more than: | | |

TABLE I-C-continued

PHYSICAL REQUIREMENTS

| | Mineral Admixture Class | |
|---|---|---|
| | F | C |
| Specific gravity, max variation from average, % | 5 | 5 |
| Percent retained on No. 325 (45 μm), max variation, percentage points from average | 5 | 5 |

CKD, on the other hand, is a by-product of the production of portland cement clinkers by the high temperature furnacing of appropriate raw materials typically mixtures of limestone and clay or a low grade limestone already containing a sufficient quantity of argillaceous materials often with added quantities of lime to adjust the final composition. The resultant clinkers are pulverized by grinding, to a high degree of fineness and these particles upon admixture with sufficient water undergo a cementitious reaction and produce the solid product generally referred to as concrete, which exhibits high compressive strength and is thus highly useful in construction of a great variety of building or supporting structures. Generally, rotary furnaces are used for producing portland cement clinkers and a certain quantity of finely divided dust is produced as a by-product which is carried off in the flue gases from such furnaces. The dust content can range from about 5% of the clinkers output in so-called wet process plants up to as high as 15% in dry process plants. The suspended dust is removed by various separating techniques and remains as a by-product of the cement making operation. Part of the CKD can be returned to the furnace as recycled raw material, but it is not readily reincorporated into clinker formation and, in addition, tends to excessively elevate the alkalinity of the ultimate portland cement.

The quantities of these two by-product materials which are produced annually are enormous and are likely only to increase in the future. As petroleum oil as the fuel for the generation of electricity is reduced because of conversation efforts and unfavorable economics vs. the more readily available coal and as political considerations increasingly preclude the construction of new nuclear power electrical generating facilities, or even the operation of already completed units of this type, greater reliance will necessarily fall on coal as the fuel for generating electricity. As of 1979, the amount of CKD was estimated as accumulating at a rate of 4–12 million tons per year in the United States alone; whereas the amount of Class F fly ash that is available is estimated to be about ten times what can be readily utilized. Obviously, there is an urgent growing need to find effective ways of employing these unavoidable industrial by-products since otherwise they will collect at a staggering rate and create crucial concerns over their adverse environmental effect.

Various proposals have already been made for utilizing both fly ash and CKD. According to the text *The Chemistry of Cement and Concrete* by Lea, Chemical Publishing Company, Inc. 1971 edition, at page 421 et seq., fly ash, i.e., Class F type, from boilers was first reported to be potentially useful as a partial replacement for portland cement in concrete construction about 50 years ago, and its utilization for that purpose has since become increasingly widespread. It is generally accepted that the proportion of portland cement replaced by the usual fly ash should not exceed about 20% to avoid significant reduction in the compressive strength of the resultant concrete, although some more cautious jurisdictions may impose lower limits, e.g., the 15% maximum authorized by the Virginia Department of Highways and Transportation (VDHT). As described in Lea at Page 437, the substitution of fly ash ends to retard the early rate of hardening of the concrete so that the concrete shows up to a 30% lower strength after seven days testing and up to a 25% lower strength after 28 days of testing, but in time the strength levels equalize at replacement levels up to 20%. Increasing the substitution quantity up to 30% gives more drastic reduction in the early compression values plus an ultimate reduction of at least about 15% after one year.

The limited substitution of fly ash for portland cement in concrete formulations has other effects beyond compressive strength changes, both positive and negative. The fly ash tends to increase the workability of the cement mix and is recognized as desirably reducing the reactivity of the portland cement with so-called reactive aggregates. On the other hand, fly ash contains a minor content of uncombusted carbon which acts to absorb air entrained in the concrete. Because entrained air increases the resistance of the hardened concrete to freezing, such reduction is undesirable but can be compensated for by the inclusion as an additive of so-called air-entraining agents.

Utilization of fly ash for up to 20% of cement in concrete mixes at best consumes only a fraction of the available quantities of this material, and efforts have been made to increase its use. Dodson et al. in U.S. Pat. No. 4,210,457, while recognizing this accepted limit proposed the substitution of larger amounts of fly ash, and preferably more, of the portland cement with certain selected natural fly ashes having a combined content of silica, alumina and ferric oxide content, less than 80% by weight, and a calcium content exceeding 10%, based on five samples of such ashes, varying from about 58–72% combined with a calcium oxide range of about 18–30%. Six other fly ash samples which are not suitable at the high levels of 50% or more were shown to vary in the combined oxide content from about 87–92% and in calcium oxide content from about 4 to about 8%. Evaluating these values against the ASTM C618-85, one observes that the acceptable fly ashes came under the Class C specifications, while the unacceptable ashes fell in the Class F specification. Thus, this patent in effect establishes that natural Class C fly ashes are suitable for substantially higher levels of replacement for portland cement in concrete mixes than are Class F fly ashes, and this capacity is now generally recognized, with Class C fly ashes being generally permitted up to about a 50% replacement level while maintaining the desirable physical properties of the concrete especially compressive strength.

In U.S. Pat. No. 4,240,952, Hulbert, et al. while also acknowledging the generally recognized permissible limit of (Class F) fly ash replacement for portland cement of 20%, proposed replacement of at lest 50% up to 80%, provided the mix contained as additives about 2% of gypsum and about 3% of calcium chloride by weight of the fly ash. The fly ash described for this purpose, however, was a natural Class C fly ash analyzing about 28% calcium oxide and combined silica, alumina and ferric oxide content of about 63%. With up to 80% of this fly ash and the specified additives, compressive strengths comparable to straight portland cement were said to be generally achievable. In one example using 140 pounds portland cement and 560 pounds of fly ash (80–20 ratio) with conventional amounts of coarse and fine aggregate, and water and including the requisite additives, compressive strengths tested at 3180 psi for 7 days, 4200 psi for 14 days and about 5000 psi at 28 days.

Obviously, the above patents cannot contribute to a solution to the problem with Class F fly ash. In U.S. Pat. Nos. 4,018,617 and 4,101,332, Nicholson proposed the use of mixtures of fly ash (apparently Class F in type), cement kiln dust and aggregate for creating a stabilized base supporting surface replacing conventional gravel-or asphalt-aggregate-stabilized bases in road construction wherein the useful ranges were fly ash 6–24%, CKD 4–16% and aggregate 60–90%, with 8% CKD, 12% fly ash and 80% aggregate preferred. Compressive strength values for such measures as revealed in the examples varied rather erratically and generally exhibited only small increases in compression strength over the 7–28 day test period. Among the better results were for the preferred mixture wherein the values increased from about 1100 psi at 7 days to 1400 psi at 28 days. The addition of a small amount of calcium chloride added about a 200 psi increment to these values. On the other hand, the addition of 3% of lime stack dust recovered from a lime kiln significantly reduced the results to about 700 psi at 7 days to 900–1300 psi at 28 days. Elimination of the aggregate reduced the strength to a fraction of the values otherwise, a mixture of 12% CKD and 88% fly ash alone showing strength values of only about 190–260 psi over the 28 day test period. Similarly, the choice of a finely divided aggregate such as fill sand resulted in about the same fractional level of strength values in the range of about 140–230 psi. A combination of finely divided and coarse aggregate in approximately equal amounts reduced the compressive strength values by about ½ with virtually no change over the test period, giving values ranging from 650–750 psi, except where 1% of Type 1 portland cement was included which restored the strength values to about their general level, except at the initial 7 days period where the strength values were about 800–900 psi increase at 28 days to about 1200–1600 psi. Curiously, the best strength results were attained when 11.6% fly ash was combined with 3.4% lime with the balance crushed aggregate, the CKD being omitted entirely, for which the strength values while starting at a lower level of about 850–950 at 7 days increased to about 1700 psi at 28 days.

The combination of fly ash and lime stack dust incidentally mentioned in the later patent was explored further by Nicholson in U.S. Pat. No. 4,038,095 which governs mixtures of about 10–14% fly ash, about 5–15% lime stack dust with the balance aggregate in the range of 71–85%. Somewhat inexplicably, the compressive results reported here for such mixtures do not reach the high level specified in the first two patents, the strength values specified being only about 1000 psi with the more general levels well below that depending on particular proportions.

In U.S. Pat. No. 4,268,316, Wills discloses the use of mixtures of kiln dust and fly ash as a replacement for ground limestone and gypsum for forming a mortar or masonry cement, using proportions of about 25–55% portland cement, about 25–65% CKD and 10–25% fly ash. When these mortar formulations were mixed with damp sand in the proportions of about one part cement mixture to 2.5–3 parts sand, compression strengths comparable to those of standard masonry cement composed of 55% cement clinkers 40% limestone and 5% gypsum were shown for mixtures containing 50% cement, 24–40% CKD and 15–25% fly ash. Inexplicably, in one example, when the cement content was increased to 55% with 35% CKD and 10-% fly ash, the compressive strengths dropped by about 30–40% at both the 7 day and 28 day ages to levels inferior to the standard material. As the cement content was decreased, with corresponding increases in the CKD, the compressive strength values dropped drastically. On the other hand, in another similar example mixtures containing 55% cement, 35% CKD and 10% ash proved superior, particularly at the 28 day age, in compressive strength to mixtures containing 50% cement, 35% fly ash and 15% CKD as well as other standard masonry cements containing 50% cement, 47% limestone and 3% gypsum. Indeed, strength values dropped about 40% for the mixtures, a 5% reduction in cement and a corresponding 5% increase in the fly ash to values definitely inferior to the standard cements. Similar variations were shown under laboratory test conditions for comparable 50/35/15 mixtures dependent on the source of the fly ash while under actual construction conditions for the same mixtures, compressive strength values were reduced by about 50% for both the conventional masonry cement containing 55% portland cement and comparable mixtures within the patented concept. The fly ash was preferably Class F with Class C materials being less desirable.

In U.S. Pat. No. 4,407,677 Wills went on to teach that in the manufacture of concrete products such as blocks or bricks, the fly ash usually employed in combination with portland cement therein could be replaced in its entirety by CKD with modes improvement in early compressive strength values for such products. Thus, at one day and two day tests compressive strength values were shown of about 500–800 psi, but were said to increase to about 1200 psi after 28 days. The mixes disclosed here contained 0.4–0.9 parts cement, about 0.1–0.6 parts CKD and 10–12 parts aggregate combining both fine and coarse materials, such as expanded shale and naturel sand in a weight ratio of 80/20. Masonry cement generally develop at least about 95% of their strength properties at 28 days age so that additional aging of the patent products would not be expected to result in any significant increase in their compressive strength values.

In a different vein, an improved highly activated fly ash is obtained by Minnick in U.S. Pat. No. 3,643,115 by injecting lime together with bituminous coal into the combustion boiler to give a synthetic flay ash developing early strength as high as five times that obtained conventionally. The improved highly active fly ash can be mixed in proportions of 80–90 parts with 5–87 parts aggregate and 5–30 parts water. The injected lime combines with the sulfur dioxide released during combustion of the coal, and additional sulfur may be needed if the coal has insufficient sulfur, giving a fly ash having a considerably increased sulfate content as well as calcium oxide and magnesium contents.

OBJECTS OF THE INVENTION

The object of the present invention is a settable composition for making general purpose concrete in which the cementitious ingredients thereof consist essentially of from about 25% to about 50% by wt. up to a maximum of 200 lbs. of Class F fly ash and cement kiln dust.

A further object is a concrete mix of the general or all purpose variety in which about 25% and preferably in excess of about 30% up to about 50% by weight of the portland cement used therein is replaced Class F fly ash and cement kiln dust, in a weight ratio of fly ash to cement kiln dust in the range of about 2:3–3:2.

SUMMARY OF RELATED INVENTION

The prior invention in application Ser. No. 07/229,454 was based on the discovery that regular or common Class F fly ash having a combined silica, alumina and ferric oxide content of at least about 70% and preferably at least about 80% by weight, as well as a calcium oxide content below about 10%, when blended homogeneously with cement kiln dust (CKD) in the proportions of 60–40/40–60% by weight yields a blend having a combined silica, alumina and ferric oxide content of at lest 50% but below about 70% with a calcium oxide content above about 10% and preferably above about 10% and satisfies the essential specification requirements for a Class C fly ash of ASTM 1618-85 and thus constitutes a new synthetic Class C fly ash product. This product has been found to be comparable with natural Class C fly ash in its important properties and especially for purposes of combination with portland cement for producing general purpose concrete. In particular, it effectively replaces the same large proportions of portland cement up to about 50% by weight as is generally approved for natural Class C fly ash in contrast to the substantially lower replacement levels allowed for Class F fly ash. By replacing at least than about 25% and preferably more than about 30% of the portland cement up to the 50% limit, substantial economic savings can be achieved because of the favorable pricing structure for the industrial waste products Class F fly ash and CKD compared to the valuable and relatively expensive commodity portland cement. For general or all purpose cement mixes, including so-called ready mixes as prepared and delivered in cement mixer trucks as well as bagged or bulk mixes for general or all purpose concrete construction, which would normally contain about 400–700 lbs. portland cement, about 1600–2000 of a coarse aggregate and a sufficient quantity of a fine generally sand-like aggregate plus minor amounts of any optional ingredients as to yield one cubic yard of concrete when admixed in water equal in amount to about 40–70% weight of the portland cement, the new synthetic Class C fly ash blend of this invention can replace at least 25% and as much as 50% by weight of the portland cement up to a limit of about 200 lbs. wt., while effectively achieving substantially the same structural properties, especially compressive strength in the resultant concrete structure as achieved with 100% portland cement.

SUMMARY OF PRESENT VARIATION

Instead of combining the Class F fly ash and CKD in an admixture to produce the new synthetic Class C fly ash contemplated in the prior related application Ser. No. 07/229,454, the same proportions of Class F fly ash and CKD can be admixed separately with the other ingredients of the general purpose concrete mix by any convenient sequence. Because all of the mix ingredients are substantially dry and do not interact until combined with water during the concrete-making process, the ultimate mix composition as well as the properties of the general purpose concrete produced therefrom are exactly the same irrespective of whether the Class F fly ash and CKD are incorporated into the mix separately or preliminarily combined together into a blend which is then added to the other ingredients, provided of course that the proportion of all ingredients remain the same. The only difference here is the need for separate storage and delivery facilities at the mix plant for the Class F fly ash and CKD individually whereas the prior concept envisioned the purchase of the new synthetic Class C fly ash as a new commodity by the mix manufacturer or ready mix operator which then needed only one storage facility.

The sequence of addition of the ingredients for present purposes is immaterial and can be in any order desired for efficient mixing. The ingredients can be loaded one by one directly into a ready-mix truck or can be combined for handling in bulk, including in bags.

The Class F fly ash and CKD are used in the relative weight ration in the range of about 3:2–2:3. The amounts of other ingredients are the same as before.

DETAILED DESCRIPTION OF THE INVENTION

Any standard or common Class F fly ash obtained from boilers and like furnaces used for the combustion of pulverized coal, particularly of a bituminous or anthracite type, and especially from coal-fired, steam-generating plants of electrical utilities, is suitable for use as the Class F fly ash component of this invention. Such fly ash should have a combined silica, alumina and ferric oxide content of at least about 70% and preferably 80% or higher by weight and a calcium oxide content below about 10%, usually about 6% by weight or less. A specific fly ash found to give particularly good result sin the invention is so-called "Carbo" fly ash obtained from the Clinch River Power of the American Electric Power Service Corporation at Carbo, Va. This specific fly ash is available from Ash Management Corp., a subsidiary of JTM Industries of Marietta, Ga. An analysis of this preferred Carbo fly ash appears in the following Table II which sets forth the chemical composition and certain physical properties of fly ash samples taken periodically from this plant over a nine month period.

TABLE II

ANALYSIS OF TYPICAL CLASS F FLY ASH

| | Sample | | | | | | | | | |
|---|---|---|---|---|---|---|---|---|---|---|
| | 1 | 2 | 3 | 4 | 5 | 6 | 7 | 8 | 9 | 10 |
| CHEMICAL ANALYSIS | | | | | | | | | | |
| Silica | 50.0 | 50.7 | 51.2 | 53.0 | 53.0 | 49.4 | 50.6 | 50.9 | 56.3 | 54.5 |
| Aluminum Oxide | 29.8 | 28.5 | 25.5 | 26.1 | 24.7 | 25.4 | 25.2 | 24.6 | 23.1 | 24.8 |
| Iron Oxide | 6.8 | 7.0 | 7.6 | 7.8 | 7.4 | 8.4 | 8.2 | 8.9 | 7.7 | 7.3 |
| Combined 1,2,3 | 86.6 | 86.2 | 84.3 | 86.9 | 85.1 | 83.2 | 84.0 | 83.5 | 87.1 | 86.6 |
| Titanium Oxide | 1.6 | 1.6 | 1.6 | 1.7 | 1.7 | 1.5 | 1.5 | 1.5 | 1.5 | 1.7 |
| Calcium Oxide | 6.1 | 6.3 | 6.6 | 4.1 | 5.7 | 7.0 | 9.1 | 6.8 | 5.8 | 5.6 |
| Magnesium Oxide | 1.7 | 1.7 | 1.8 | 1.6 | 1.6 | 1.8 | 2.0 | 1.8 | 1.4 | 1.6 |
| Sodium Oxide | 0.8 | 0.6 | 0.6 | 0.6 | 0.7 | 0.6 | 0.7 | 0.6 | 0.6 | 0.6 |
| Potassium Oxide | 2.5 | 2.8 | 2.6 | 2.9 | 2.4 | 2.8 | 2.5 | 2.9 | 2.7 | 2.6 |
| Sulfur Trioxide | 0.9 | 0.8 | 0.7 | 0.5 | 0.6 | 0.9 | 1.0 | 0.9 | 0.9 | 0.8 |
| Phosphorus Pentoxide | 0.3 | 0.2 | 0.2 | 0.2 | 0.2 | 0.2 | 0.2 | 0.3 | 0.3 | 0.2 |

TABLE II-continued

ANALYSIS OF TYPICAL CLASS F FLY ASH

| | Sample | | | | | | | | | |
|---|---|---|---|---|---|---|---|---|---|---|
| | 1 | 2 | 3 | 4 | 5 | 6 | 7 | 8 | 9 | 10 |
| Other Constituents | 1.2 | 1.0 | 1.1 | 0.7 | 0.7 | 0.6 | 0.6 | 0.7 | 0.7 | 1.0 |
| Available Alkalies, % | .65 | .78 | .77 | .76 | .66 | .78 | .76 | .70 | .78 | .83 |
| Averaged Combined 1, 2, & 3 = 85.3; av. CaO = 6.21 | | | | | | | | | | |
| PHYSICAL TESTS | | | | | | | | | | |
| Moisture Content, % | .02 | .14 | .05 | .03 | .02 | .18 | .05 | .01 | .12 | |
| Neg Ignition Loss | 1.07 | 1.27 | 1.01 | 0.94 | 0.60 | 0.76 | 0.62 | 0.82 | 0.75 | |
| Retained on No. 325, Wet-Sieved, % | 19.99 | 21.68 | 20.39 | 20.58 | 19.34 | 17.66 | 19.13 | 22.53 | 20.80 | |
| Specific Gravity | 2.27 | 2.24 | 2.22 | 2.25 | | 2.26 | 2.26 | 2.27 | 2.26 | |

Identification of other common Class F fly ashes can be found throughout the literature. For example, U.S. Pat. No. 4,210,457 mentioned previously, provides an analysis in Table I thereof for six samples of Class F fly ashes, identified F–K from which the content of constituents thereof expressed as a weight percent range and an average value are summarized in the following Table III.

TABLE III

VARIOUS CLASS F FLY ASHES FROM USP 4,210,457

| | Main Components, % wt. | |
|---|---|---|
| | Range | Average |
| $SiO_2$ | 43.3–56.3 | 49.3 |
| $Al_2O_3$ | 18.5–31.0 | 24.65 |
| $Fe_2O_3$ | 5.6–29.9 | 14.2 |
| CaO | 4.3–7.7 | 5.95 |
| $SiO_2 + Al_2O_3 + Fe_2O_3$ | 93.9–91.7 | 88.1 |

In addition, the Lea text identified above gives in Table 71 at Page 422 an analysis for four Class F fly ashes, two from the USA and two from Great Britain. Similarly, analysis for representative fly ashes, both Class F and Class C, from Texas sources appear at pages 175–178 in Research Report 450-1, project 3-9-85-450 by Center for Transportation Research, Bureau of Engineering Research, the University of Texas at Austin, entitled "Effectiveness of Fly Ash Replacement in the Reduction of Damage Due to Alkali-Aggregate Reaction in Concrete" by Farbiarz and Carrasquillo, May 1986. In this report, the Class F fly ashes are identified as "Type A"; while the Class C fly ashes are identified as "Type B" according to whether the fly ashes contain a high content of combined silica, alumina and ferric oxide with low calcium oxide or vice versa. One sample described in this report illustrates the unreliability of a classification of fly ashes along geological lines, i.e., whether derived from bituminous and anthracite coal versus subituminous and lignite coal, that sample being considered a Type B (Class C) ash despite its derivation from sublignite and a normal classification by its supplier as Class F.

Similarly, any common cement kiln dust (CKD) which is produced as a by-product during the industrial production of portland cement would in principle be suitable for purposes of this invention. One specific CKD, obtained as a matter of convenience, from the Tarmac Lone Star Cement Company cement plant at Roanoke, Va., has been found entirely useful in the invention, and an analysis of this CKD is set forth in the following Table IV.

TABLE IV

ANALYSIS OF TYPICAL CEMENT KILN DUST (CKD)

| Chemical Analysis, % | |
|---|---|
| Insoluble Residue | |
| $SiO_2$ | 16.80 |
| $Al_2O_3$ | 5.12 |
| $Fe_2O_3$ | 2.38 |
| CaO | 45.89 |
| MgO | 2.22 |
| $SO_3$ | 4.93 |
| $K_2O$ | 2.65 |
| $Na_2O$ | 40.00 |
| Total Alkali | 2.14 |
| Combine 1, 2, & 3 | 24.3 |
| Loss of Ignition | 19.60 |

| Particle Size | |
|---|---|
| Sieve # | % Passing |
| 20 | 98.6 |
| 50 | 96.5 |
| 100 | 93.8 |
| 200 | 85.4 |
| 325 | 74.6 |

Composition for various samples of CKD can be found in the patent literature wherein, for example, nine different samples have been analyzed by Nicholson in U.S. Pat. No. 4,018,617 mentioned previously. A summary of the range and average of the weight percent values for contents of the main components of these nine samples as taken from this patent appears below as Table V.

TABLE V

VARIOUS CKD'S FROM U.S. Pat. No. 4,019,617
Main Components, % wt

| | Range | | |
|---|---|---|---|
| Ingredient | Low | High | Average |
| $SiO_2$ | 6.0 | 28.5 | 16.5 |
| $Al_2O_3$ | 3.2 | 9.6 | 4.35 |
| $Fe_2O_3$ | 0.8 | 5.9 | 2.66 |
| CaO | 16.0 | 65.0 | 47.6 |
| Combine 1, 2, & 3 | 10.0 | 44.0 | 23.5 |

As is known, Class F fly ashes generally contain a certain amount of elemental carbon resulting from incomplete combustion of the pulverized coal and because of the undesirable effects of the carbon content thereof on the air entrainment capability of concrete prepared from mixes containing the same, as stated before, the amount of such carbon is ordinarily restricted. An upper limit of 6% is common for many jurisdictions; although others such as the VDHT permit only 2.5% carbon. On the other hand, certain countries, such as Canada, allow up to 12% carbon. Because in the practice of the invention, the Class F fly ash is employed in fairly minor amounts, the effective amount of carbon contained in the ultimate overall mix is proportionately reduced from the amount in the starting Class F fly ash whereby higher fly ash contents in the latter are tolerable. Thus, the carbon content of the present compositions is well within even the lower permissible limits and often is negligibly small.

As will be established later, within the above limits for the compositions of the invention, the concrete produced therefrom exhibit substantially comparable properties for use in general purpose cement construction, especially compressive strength to corresponding all portland cement mixes. This being the case, economic considerations may be an important factor in selecting a specific mix within such ranges. Under present market conditions, and dependent upon transportation distances from the available sources of the two components, CKD can be purchased somewhat more cheaply than can a standard Class F fly ash. For example, fly ash might be purchased at a cost of $20.00 per ton including transportation expense of about $7.00 per ton; whereas CKD can be purchased for about $9.00 per ton including about $4.00 transportation expense. Where the relative expense significantly favors one of the products, such as CKD, it is economically advantageous to utilize a larger amount of the cheaper constituent. Thus a mix having a weight ratio of Class F fly ash to CKD of 2:3 would be cheaper to produce than a ratio of 3:2.

The choice of aggregate material for concrete mixes using the present blends will pose not problem to the person skilled in the design of such mixes. The coarse aggregate should have a minimum size of about ⅜ inch and can vary in size from that minimum up to one inch or larger, preferably in gradations between these limits. Crushed limestone, gravel and the like are desirable coarse aggregates, and the material selected in any case should exhibit a considerable hardness and durability inasmuch as crumbly, friable aggregates tend to significantly reduce the strength of the ultimate concrete. The finely divided aggregate is smaller than ⅜ inch in size and again is preferably graduated in much finer sizes down to 200 sieve size or so. Ground limestone, sand and the like are common useful fine aggregates.

Several different types of portland cement are available and all are in principle, useful. Type I is the general purpose variety and is most commonly employed but Type III can be substituted if early strength development is desirable. Commercial blended cements, such as Type I-P, wherein 20% Class F fly ash is blended with 80% by weight portland cement clinker during pulverization should be avoided.

The mixes of the invention are prepared by homogeneously and uniformly mixing all of the mix ingredients including the Class F fly ash and CKD. The Class F fly ash has a specific gravity of about 2.25, while that of CKD is around 2.70. These relatively small differences in specific gravities does not create any unusual problems in the preparation of the present compositions and any of the usual mixing techniques commonly employed in the concrete mix industry as suitable. The ultimate compositions are no more susceptible to undergo separation during handling and storage than are ordinarily concrete mixes. They can be transported and stored in the same manner as the ordinary mixes as can the individual ingredients. The storage containers should, of course, be closed to protect the contents thereof from weather.

In formulating specific mixes for concrete construction, reference should be made to the procedures established therefor by the American Concrete Industry (ACI). As is well known by those knowledgeable in the area, ACI concrete design mixes are calculated on an absolute volume basis to give a cubic yard or 27 ft$^3$ of the desired concrete. By absolute volume is meant the theoretical volume of each constituent of the mix relative to the volume of 1 ft$^3$ of water. By knowing specific gravity of each of the various constituent materials, one can readily calculate the absolute volume thereof independently of actual density variations. In the industry, concrete mixes are arbitrarily identified in terms of certain even-numbered levels of compression strength, such as a "3000# concrete", a "4000# concrete", etc. By usage, the actual concrete rated at the respective levels is expected to possess an actual compressive strength substantially higher, usually by an increment of about 1200 psi, than the rated level, Thus, a "3000# concrete" would be expected to have an actual compression strength of at least 4200 psi, while a "6000# concrete" would have an actual compression strength of at least 7200 psi. The industry also refers to cement mixes in terms of the number of bags of portland cement, each of 94 lb. weight, that would be utilized to give a cubic yard of the mix, the bag number being known from experience to have a rough correlation with a given compression strength. Thus, a "4 bag mix" would roughly equate with a "2500# concrete" and a "7.5 bag mix" with a "6000# concrete". This correlation is only general at best since the actual compression strength exhibited by any specific concrete mix design can only be determined by actual experimental testing.

A number of design mixes based on the synthetic Class C fly ash blends of the prior application Ser. No. 07/227,454 were prepared and analyzed and tested according to accepted standards as established by ASTM and ACI, and the results of these analyses and tests are set for the in the tabulations of the examples. The concrete design mixes specified therein were devised using the ACI procedure. Preferably, the concrete mixes of the invention would contain per cubic yard portland cement in the range of about 400–700# before any replacement thereof with Class F fly ash and CKD covering the range of about a 4.0 bag mix to an 8.0 bag mix. Concrete with less than about 400 lb. portland cement tends to be quite weak and has only limited usefulness. On the other hand, concrete containing per cubic yard more than 8 bags of cement are known but are specialized products exhibiting extremely high levels of compressive strength and specialized knowledge is needed in the formulation and utilization of such mixes. In the present compositions, about 25–50% of the portland cement can be replaced up to a maximum replacement of roughly about 200 lbs. or so of portland cement in order to avoid risk of loss in compression strength with at the higher "bag" levels of portland cement needed for high compressive strength concrete mixes. That is, for a 4 bag mix, about 50% of portland cement could be replaced while for a 7.5-8 bag ix, the amount of replaced portland cement should be limited to about 200# or about 26–28% because if the content of portland cement were reduced proportionately in the higher bag mixes, the concrete produced therefrom would suffer in compression strength to an undesirable degree.

The amount of the coarse aggregate used in mixes containing this range of portland cement would be in the rage of about 1600–2000#, dependent mainly with the so-called fineness modulus of the fine aggregate as determined by the supplier thereof and applying an established ACI correlation. This weight range is based on a unit weight of coarse aggregate of 100#/ft$^3$, a fineness modular of 2.4–2.7 and a volume % of coarse aggregate per yard$^3$ of concrete of 0–/5–0.7 for a maximum aggregate size of ½–1". Coarse aggregate can vary in unit weight generally within a range of 90–100#/ft$^3$ and the above range can vary accordingly about ±10%. The amount of the water needed for admixture with such mixes to make good concrete would vary between about 40–70% by weight of the total of cementitious materials present including the Class F fly ash and CKD as well as portland cement. As the examples show, the inclusion of small amounts of optional additives is customary, particularly such additives as air entraining agents and water reducing agents, all of which are known and need no further description here. After the collective amount of these several materials has been determined, the balance of he mix to make one cubic yard is constituted by the fine aggregate such as sand, and this amount is adjusted to reflect changes in the quantities of the other ingredients. That is, the total absolute volume of all ingredients other than fine aggregate, including the volume of air allocated by design specification for entrained air, is subtracted from 27 ft$^3$ to give the ft$^3$ to be supplied by fine aggregate. The difference in ft$^3$ can be converted to weight by multiplying it by the specific gravity of the fine aggregate times the wt/ft$^3$ of water (62.4#). It will, of course, be understood that the dosage rates specified in the exemplary mix designs, particularly for the additives such as the air entraining agent, etc., may need adjustment due to changes in temperature and other local factors.

The results in the following examples were actually obtained by preliminarily blending, in each case, the Class F fly ash and CKD together in accordance with the concept of the prior application and combining the blend with the other mix ingredients. However, the results would be identical if the same proportionate amount for each of the Class F fly ash and CKD was added separately to the remaining mix ingredients and the proportionate amounts of the Class F fly ash and CKD have been expressed in each case in terms of their relative weight ratio of the particular mix.

EXAMPLE 1

Concrete Mix Designs, Air Entrainment Type, with Class F Fly Ash and CKD
In Weight Ratio of 1:14, 42% Class F Fly Ash, 58% CKD by Weight

|  | Mix D-5 (4.5 bags) | Mix D-6 (5.0 bags) | Mix D-7 (5.5 bags) | Mix D-8 (6.7 bags) |
|---|---|---|---|---|
| Santee Cement I, pounds | 236 | 284 | 338 | 526 |
| Class F Fly Ash, pounds | 79 | 78 | 75 | 44 |
| CKD, pounds | 110 | 108 | 103 | 61 |
| Total Cementitious Materials, lbs. | 425 | 470 | 516 | 631 |
| % of Above Fly Ash and CKD combined | 44.5 | 39.6 | 34.5 | 16.6 |
| Cormix ARE Agent, ounces | 6.0 | 8.0 | 10.0 | 9.0 |
| Cormix Water Reducer, ounces | 22.1 | 23.6 | 25.9 | 31.7 |
| #67 Vulcan Stone, pounds | 1750 | 1750 | 1750 | 1750 |
| Vulcan Concrete Sand, pounds | 1492 | 1468 | 1428 | 1337 |
| Total Mix Water, Gallons | 33.0 | 33.0 | 33.0 | 33.0 |
| Water-Cement Ratio (All cementitious materials) | 0.65 | 0.58 | 0.53 | 0.44 |
| Slump, inches | 2.5 | 4.25 | 3.25 | 3.25 |
| Air Content, percent | 4.5 | 5.9 | 4.1 | 5.2 |
| Temperature of concrete F | 83 | 83 | 84 | 85 |
| Temperature of air, F | 85 | 84 | 84 | 84 |
| Unit Weight, lbs/cu ft | 147.0 | 147.4 | 147.2 | 148.1 |
| COMPRESSIVE STRENGTH, PSI | | | | |
| 7-Day Test Results | 2441 | 2618 | 3520 | 4950 |
|  | 2480 | 2564 | 3467 | 5005 |
| Average | 2461 | 2591 | 3494 | 4978 |
| 28-Day Test Results | 3500 | 3714 | 4320 | 5730 |
|  | 3400 | 3767 | 4369 | 5836 |
|  | 3431 | 3784 | 4240 | 5889 |
| Average | 3444 | 3755 | 4310 | 5818 |
| 56-Day Test Results | 4070 | 4369 | 5005 | 6013 |

AGGREGATE DATA

| | % PASSING | |
|---|---|---|
| Sieve Size | Fine Aggregate | Coarse Aggregate |
| 1" |  | 100.0 |
| ¾" |  | 87.9 |
| ½" |  | 28.3 |
| ⅜" | 100 | 6.6 |
| #4 | 99.8 | 1.3 |
| #8 | 85.3 | 0.8 |
| #16 | 60.0 |  |
| #30 | 44.2 |  |
| #50 | 28.1 |  |
| #100 | 15.2 |  |

EXAMPLE 1-continued

| | | |
|---|---|---|
| #200 | 5.1 | Trace |
| Fineness Modulus | 2.67 | — |
| Specific Gravity | 2.93 | 2.80 |
| Absorption, percent | 0.30 | 0.40 |
| Dry Rodded Unit Weight, pcf | 121.5 | 96.40 |

Mix D-6 of Example 1 above (containing 284# portland cement) was compared in the field with a similar conventional mix formulated according to the same mix design protocol except for the use in the commercial mix of 400# of portland cement plus 100# of a typical Class F fly ash (20% replacement level) for a total weight of cementitious materials of 500#, this mix being rated as a "3000# cement". Samples taken in the field were tested for compression strength using standardized techniques and the resultant values are compared below.

Example 2

Comparison of Mix D-6 of Example 1 with Similar Conventional Mix

| | Compressive Strength Result | | |
|---|---|---|---|
| | at 7 days | at 28 days | at 56 days |
| Mix D-6 | 2280 | 3465 | 4225 |
| Regular 3000# Mix | 2270 | 3600 | 4240 |

It will be noted that the above values do not correspond exactly with the values for Mix D-6 as specified in Example 1. The latter values were determined under laboratory conditions, and as is to be expected small variations in such values of about plus or minus 10% are entirely normal.

Example 3

Concrete Mix Designs, Air Entrainment Type, with Class F Fly Ash and CKD at weight Ratio of 1:1.4

| | Mix C-1 (4.5 bag) | Mix C-2 (5.0 bag) | Mix C-3 (6.0 bag) |
|---|---|---|---|
| LeHigh Cement II, lbs. | 240 | 280 | 374 |
| Class F Fly Ash, lbs. | 80 | 80 | 80 |
| CKD, lbs. | 110 | 110 | 110 |
| Total Cementitious Material, lbs. | 430 | 470 | 564 |
| % of Above for Fly Ash and CKD combined | 44.2 | 40.4 | 33.7 |
| Pozzolith 322-N, ozs. | 17.2 | 18.8 | 22.6 |
| Micro Air, ARE, Agent, ozs. | 2.0 | 2.2 | 2.6 |
| Limon Springs Natural Sand | 1298 | 1267 | 1188 |
| Vulcan #68 Stone, lbs. | 1750 | 1750 | 1750 |
| Total Mix Water, gals | 34.5 | 34.5 | 34.5 |
| Water-Cement Ratio (All Cementitious Materials) | 0.64 | 0.61 | 0.51 |
| Slump, inches | 4.0 | 3.5 | 4.0 |
| Air Content, Percent | 5.8 | 5.0 | 5.2 |
| Temperature of concrete, F | 76 | 73 | 72 |
| Temperature of Air, F | 76 | 77 | 77 |
| Unit Weight, lbs/cu. ft. | 142.9 | 144.9 | 145.9 |
| COMPRESSIVE STRENGTH TEST RESULTS | | | |
| 7-Day Test Results | 1981 | 2829 | 3678 |
| | 2016 | 2688 | 3749 |
| Average | 1998 | 2758 | 3714 |
| 28-Day Test Results | 3395 | 4421 | 5376 |
| | 3395 | 4739 | 5516 |
| Average | 3395 | 4580 | 5446 |
| 56-Day Test Results | 4173 | 4952 | 6083 |
| | 4244 | 5164 | 6296 |
| Average | 4208 | 5058 | 6190 |

TEST DATA ON AGGREGATES

| | PERCENT PASSING | |
|---|---|---|
| Sieve Size | Fine Aggregate Limon Springs Sand | Coarse Aggregate Vulcan #68 Stone |
| 1" | | 100.0 |
| ¾" | | 87.9 |
| ½" | | 28.3 |
| ⅜" | | 6.6 |
| #4 | 100.0 | 1.3 |
| #8 | 98.0 | 0.8 |
| #16 | 82.0 | |
| #30 | 45.0 | |
| #50 | 20.0 | |
| #100 | 3.0 | |
| #200 | 1.5 | |
| Fineness Modulus | 2.53 | — |
| Absorption, Percent | 1.0 | 0.41 |
| Specific Gravity | 2.64 | 2.62 |
| Dry Rodded Unit Weight, pcf | 97.48 | 99.48 |

Example 4

Plain Mix Design Using 42% Class F Fly Ash and CKD in Weight Ratio of 1:1.4

| | Mix PL-1 (4.5 bag) | Mix PL-2 (6.5 bag) | Mix PL-3 (7.5 bag) |
|---|---|---|---|
| Lone Star Cement II, lbs. | 327 | 421 | 515 |
| Class F Fly Ash, lbs | 80 | 80 | 80 |
| CKD, lbs | 110 | 110 | 110 |
| Total Cementitious, lbs. | 517 | 611 | 705 |
| % Cement Replaced | 37.75 | 31.1 | 27 |
| Pozzolith 133-N$^{1/}$, oz. | 20.7 | 24.4 | 28.2 |
| Martinsville #57, Stone, lbs. | 1870 | 1870 | 1870 |
| Madison Natural Sand, lbs. | 1330 | 1250 | 1175 |
| Total Mix Water, gals. | 40.0 | 40.0 | 40.0 |
| Water-Cement Ratio (All Cementitious Materials) | 0.645 | 0.55 | 0.473 |
| Slump, inches | 3.50 | 3.75 | 4.25 |
| Unit Weight, lbs/cu. ft. | 151.2 | 151.1 | 152.2 |
| Temperature of concrete, F | 81 | 80 | 71 |
| Temperature of Air, F | 82 | 82 | 71 |
| COMPRESSIVE STRENGTH TEST RESULTS | | | |
| 7-Day Test Results | 2546 | 3183 | 4315 |
| | 2617 | 3183 | 4244 |
| Average | 2582 | 3183 | 4280 |
| 28-Day Test Results | 4067 | 4598 | 5659 |
| | 3926 | 4386 | 5730 |
| Average | 3997 | 4492 | 5695 |

Example 4-continued

| 56-Day Test Results | 4244 | 5199 | 6367 |
|---|---|---|---|
|  | 4386 | 5128 | 6084 |
| Average | 4315 | 5164 | 6226 |

AGGREGATE DATA

| | % PASSING | |
|---|---|---|
| Sieve Size | Fine | Coarse |
| 1" |  | 100.0 |
| ¾" |  | 73.5 |
| ½" |  | 25.5 |
| ⅜" | 100.0 | 5.1 |
| #4 | 99.9 | 1.6 |
| #8 | 95.7 | 1.3 |
| #16 | 81.1 |  |
| #30 | 44.0 |  |
| #50 | 12.3 |  |
| #100 | 2.5 |  |
| Fineness Modulus | 2.65 | — |
| Absorption, Percent | 1.50 | 0.35 |
| Specific Gravity | 2.61 | 2.81 |
| Dry Rodded Unit Weight, pcf | 94.4 | 103.4 |
| Material Finer than 200 mesh | 0.6 | trace |

[1] a commercial water-reducing agent

Example 5

Air Entrainment Mix Using 42% Class F Fly Ash and CKD in Weight Ratio of 1:1.4

| | Mix ARE-1 (4.5 bag) | Mix ARE-2 (5.0 bag) | Mix ARE-3 (6.0 bag) |
|---|---|---|---|
| Lone Star Cement II, lbs. | 327 | 421 | 515 |
| Class F Fly Ash, lbs. | 80 | 80 | 80 |
| CKD, lbs. | 110 | 110 | 110 |
| Total Cementitious, lbs. | 517 | 611 | 705 |
| % Cement Replaced | 37.75 | 31.1 | 27 |
| MBVR-C ARE Agent,[1] ozs. | 3.0 | 4.0 | 5.0 |
| Pozzolith 133-N, oz. | 20.7 | 24.4 | 28.2 |
| Martinsville #57, Stone, lbs. | 1870 | 1870 | 1870 |
| Madison Natural Sand, lbs. | 1240 | 1165 | 1085 |
| Total Mix Water, gals. | 34.0 | 34.0 | 34.0 |
| Water-Cement Ratio (All Cementitious Materials) | 0.55 | 0.46 | 0.40 |
| Slump, inches | 4.00 | 3.75 | 3.50 |
| Unit Weight, lbs/cu. ft. | 151.2 | 151.1 | 152.2 |
| Air Content, % | 4.5 | 5.0 | 4.7 |
| Temperature of concrete, F | 76 | 80 | 73 |
| Temperature of Air, F | 78 | 82 | 72 |

COMPRESSIVE STRENGTH TEST RESULTS

| 7-Day Test Results | 2688 | 3395 | 4386 |
|---|---|---|---|
|  | 2688 | 3395 | 4456 |
| Average | 2688 | 3395 | 4421 |
| 28-Day Test Results | 4386 | 4775 | 5800 |
|  | 3820 | 4881 | 5871 |
| Average | 4103 | 4828 | 5836 |
| 56-Day Test Results | 4492 | 5376 | 6225 |
|  | 4633 | 5341 | 6225 |
| Average | 4563 | 5359 | 6225[2] |

[1] Commercial Air Entraining Agent
[2] Values are low due to weakness of above aggregate
Aggregate Data same as Example 4

Example 6

Air-Entrainment Mix Designs Using Various Weight Ratios of Class F Fly Ash and CKD

| | Mix FCl |
|---|---|
| Lone Star Cement I, lbs. | 280 |
| Total Class F Fly Ash and CKD, lbs. | 190 |
| Daravair ARE Agent, ozs. | 5.0 |
| WRDA Water Reducer, ozs. | 20.0 |
| #5 Rockydale Stone, lbs. | 1110.0 |
| #7 Rockydale Stone. lbs. | 740.0 |
| Lone Star Natural Sand, lbs. | 929.0 |
| Castle Sand, lbs. | 394.0 |
| Total Mix Water, gals | 33.0 |
| Water-Cement Ratio | 0.58 |
| Concrete Temperature, F. | 67–69 |
| Air Temperature, F. | 70–72 |

TEST DATA ON AGGREGATES

| | Percent Passing | |
|---|---|---|
| Sieve size | Fine Aggregate 70/30 Blend | Coarse Aggregate 60/40 Blend |
| 1 ½" |  | 100.0 |
| 1" |  | 95.2 |
| ¾" |  | 70.1 |
| ½" |  | 47.0 |
| ⅜" |  | 29.9 |
| #4 | 100.0 |  |
| #8 | 97.8 |  |
| #16 | 92.6 |  |
| #30 | 80.9 |  |
| #50 | 47.5 |  |
| #100 | 11.5 |  |
| #200 | 2.1 |  |
| Fineness Modulus | 2.68 | — |
| Absorption, % LS1 0.4 Castle | 0.5 | 0.4 |
| Specific Gravity LS1 2.64 Castle | 2.61 | 2.80 |

Test Results for Various Blend Proportions of Class F Fly Ash and CKD

| Misc. | 1:1.5 | 1:1.2 | 1:1 | 1.2:1 | 1.5:1 | 4:1[1] |
|---|---|---|---|---|---|---|
| Slump, Inc. | 4.0 | 4.25 | 4.5 | 3.75 | 3.5 | 3.0 |
| Air Content % | 4.5 | 6.0 | 5.0 | 4.2 | 5.5 | 4.0 |
| Unit Wt. #/ft³ | 146 | 144 | 144.6 | 145.9 | 144.8 | 146.0 |
| Compressive Strength |  |  |  |  |  |  |
| 7 day | 3112 | 3042 | 3042 | 3112 | 3085 | 3006 |
|  | 3112 | 3042 | 3254 | 3072 | 2971 | 2959 |
| Av. | 3112 | 3042 | 3148 | 3094 | 3028 | 2982 |
| 28 day | 4562 | 4456 | 4456 | 4103 | 4315 | 4845 |
|  | 4562 | 4173 | 4386 | 4386 | 4244 | 5199 |
| Av. | 4562 | 4314 | 4436 | 4244 | 4280 | 5022 |
| 56 day | 5659 | 5376 | 5411 | 5376 | 5411 | 6048 |
|  | 5624 | 5586 | 5659 | 5482 | 5341 | 6437 |
| Av. | 5642 | 4482 | 5535 | 5429 | 5376 | 6242 |

[1] Comparative Example: 30% cement replacement, using 329# portland cement and 113# of Class F Fly ash and 28# of CKD.

What is claimed is:

1. In a composition for producing general purpose concrete which comprises per cubic yard of the concrete to be produced a generally homogeneous admixture of about 400–750 lbs. portland cement, about 1600–2000 lbs. coarse aggregate of a size of at least about ⅜ inch, and sufficient fine aggregate of a size less than ⅜ inch and up to minor amounts of conventional additives to yield one cubic yard when the admixture is combined with water in an amount equal to about 40–70% by weight of said portland cement, the improvement wherein said portland cement in said admixture is partially replaced with a) Class F fly ash having a calcium oxide content up to about 6% and b) cement kiln dust, said Class F fly ash and cement kiln dust being present in amounts having a weight ratio of about 2:3–3:2 and which When combined equal about 25% up to about 50% by weight of said portland cement but not more than about 200 lbs. of said Portland cement.

2. The composition of claim 1 wherein said coarse aggregate has a size up to about 1".

3. The composition of claim 1 wherein at least about 30% of said portland cement is replaced.

4. The composition of claim 1 wherein said fly ash has a combined content of silica, alumina and ferric oxide exceeding 70% and a calcium oxide content of less than 10% and said fly ash and cement kiln dust together have a content of silica, alumina and ferric oxide higher than about 50% but less than about 70% and a calcium oxide content higher than 10%.

5. The composition of claim 1, wherein said fine aggregate is graduated in size from about #100 up to about #4 sieve size and said coarse aggregate is graduated in size from about ⅜" up to at least about ¾" size.

6. A composition for producing general purpose concrete which comprises per cubic yard of the concrete to be produced a generally homogeneous admixture of about 400–750 lbs. cementitious ingredients, about 1600–2000 lbs coarse aggregate of a size of a at least about ⅜ inch, and sufficient fine aggregate of a size less than ⅜ inch and up to minor amounts of conventional additives to yield one cubic yard when the admixture is combined with water in an amount equal to about 40–70% by weight of said cementitious ingredients, said cementitious ingredients consisting essentially of about 50–75% by weight of portland cement and a combined amount equal to about 25–50% by weight up to a maximum of about 200 lbs of Class F fly ash having a calcium oxide content up to about 6% and cement kiln dust, said fly ash and cement kiln dust having a weight ratio in the range of about 2:3–3:2.

7. The composition of claim 6, wherein said fine aggregate is graduated in size from about #100 up to about #4 sieve size and said coarse aggregate is graduated in size from about ⅜" up to at least about ¾ size.

8. In a method of making general purpose concrete which comprises the step of mixing concrete-making ingredients comprising 400–750 lbs. portland cement, about 1600–2000 lbs. coarse aggregate of a size of at least about ⅜ inch, and sufficient fine aggregate of a size less than ⅜ inch and up to minor amounts of optional conventional additives to yield one cubic yard when the admixture is combined with water equal to about 40–70% by weight of said cement, the improvement of partially replacing said Portland Cement with Class F fly ash having a calcium oxide content up to about 6% and cement kiln dust in a combined amount equal to about 25% to about 50% of said Portland cement, the Class F fly ash and said cement kiln dust being present in a weight ratio of said fly as to said cement kiln dust of about 2:3–3:2.

9. The method of claim 8, wherein said fine aggregate is graduated in size from about #100 up to about #4 sieve size and said coarse aggregate is graduated in size from about ⅜ up to at least ¾ size.

* * * * *